United States Patent
Garakani et al.

(10) Patent No.: US 7,623,273 B1
(45) Date of Patent: *Nov. 24, 2009

(54) TECHNIQUE FOR CONNECTING V.34 FAX MACHINES VIA FAX RELAY GATEWAYS WHICH ARE NOT ADAPTED TO SUPPORT V.34 FAX MODULATION

(75) Inventors: Mehryar Khalili Garakani, Westlake Village, CA (US); Steven J. White, San Mateo, CA (US); Ilya Umansky, San Jose, CA (US); Herbert Michael Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1075 days.

This patent is subject to a terminal disclaimer.

(21) Appl. No.: 10/743,980

(22) Filed: Dec. 22, 2003

(51) Int. Cl.
*H04N 1/00* (2006.01)
(52) U.S. Cl. .................. 358/407; 358/442; 358/434; 379/100.17; 379/93.31; 370/352; 370/389
(58) Field of Classification Search ............ 358/1.15, 358/442, 402, 407, 434, 426.16; 379/100.17, 379/93.32, 93.31, 142.28, 227; 370/352, 370/321, 401, 389
See application file for complete search history.

(56) References Cited

U.S. PATENT DOCUMENTS

| | | | | |
|---|---|---|---|---|
| 5,719,688 | A * | 2/1998 | Kagami | 358/468 |
| 6,122,071 | A * | 9/2000 | Yoshida | 358/434 |
| 6,292,509 | B1 * | 9/2001 | Fujino | 375/222 |
| 6,449,349 | B1 * | 9/2002 | Higuchi | 379/100.17 |
| 6,563,217 | B2 * | 5/2003 | Corisis et al. | 257/738 |
| 7,038,800 | B2 * | 5/2006 | Ono et al. | 358/1.15 |
| 2005/0168785 | A1 * | 8/2005 | Garakani et al. | 358/434 |
| 2006/0067301 | A1 * | 3/2006 | Fruth et al. | 370/352 |

OTHER PUBLICATIONS

Pete Davidson, Davidson Consulting; *V.34 Fax: Superior Performance and Cost Savings*; Feb. 2003; 6 pages including title and credit page.
Dr. Frank Gao, GAO Research and Consulting; *Modem and Fax Standards and Software*; Copyright 1996-2003; pp. 1-8.
Applied Signal Technology, Inc.; *Interpreting the Group 3 FAX Setup Protocol*; copyright 1989; Chapter 2.0 pp. 1-3.
*Voice Networks, Voice Over IP, IP Telephony*; ; pp. 1-49; Data Network Resource.
AudioCodes; *Fax Relay over Packet Networks*; Dec. 25, 2002; pp. 1-18.
Fax Services over IP Overview, Cisco IOS Fax Services over IP Application Guide; pp. 1-24.
H. Schulzrinne; S. Petrack; T. Taylor; *Definition of Events for Modem FAX, and Text Telephony Signals*; Feb. 17, 2005; pp. 1-41.

* cited by examiner

*Primary Examiner*—Houshang Safaipour
*Assistant Examiner*—Negussie Worku
(74) *Attorney, Agent, or Firm*—Marger Johnson & McCollom, P.C.

(57) ABSTRACT

A method and system for connecting V.34 enabled fax machines (that is fax machines capable of operating at 33,600 bps) over network gateways that use the un-enhanced T.38 protocol, that is, gateways that have not been upgraded to handle the V.34 33,600 bps protocol in fax relay mode. When a gateway detects a V.8 protocol signal, the signal is modified so that the fax machines fall back to non V.34 protocol and operate at a slower speed which the un-enhanced T.38 gateway is capable of handling.

15 Claims, 4 Drawing Sheets

Network Configuration

Figure 1A  Network Configuration

TECHNIQUE FOR CONNECTING V.34 FAX MACHINES VIA FAX RELAY GATEWAYS WHICH ARE NOT ADAPTED TO SUPPORT V.34 FAX MODULATION

FIELD OF THE INVENTION

The present invention relates to packet networks and more particularly to inter connecting fax machines over an IP network.

BACKGROUND OF THE INVENTION

E-mail has become a preferred and widely used means of communication; however, fax machines are still in widespread use. Fax machines are still often used to transmit complex documents, news clippings, pictures, illustrations, signatures and various other types of messages.

In the past, fax machines were generally interconnected using conventional analog telephone circuits operating using a time division multiplex protocol (hereinafter called TDM). Currently, however, many fax messages are transmitted over packet networks. When fax machines are interconnected over a packet network, the initial connection is typically made using a voice grade connection. Subsequently, when the actual fax transmission begins, the network connection generally switches to a protocol known as fax relay.

Fax machines known as Group 3 fax machines are capable of operating at top speed of 14,400 bits per second (hereinafter bps). More modern fax machines, known as Super Group 3 fax machines are capable of operating at speeds of up to 33,600 bps. Super Group 3 fax machines utilize a protocol known as the V.34 fax protocol.

In general when fax machines are connected over a TDM (time division multiplex) circuit, the calling machine initially tries to connect at the highest speed at which the fax machine is capable of operating. If a connection can not be made at this speed, the machine typically "falls back" and tries to make a connection at a slower speed. For example, when a V.34 Super Group 3 fax machine connects to a Group 3 fax machine over a TDM circuit, the Super Group 3 fax falls back in speed and operates at the speed of the Group 3 machine.

When V.34 fax machines initially contact each other, they use a V.8 protocol. According to the V.8 protocol, the answering fax machine (hereinafter referred to as the second fax machine) generates a AnsAm tone (that is, a 2100 Hz tone with a 15 Hz envelope). The AnsAm tone tells the first fax machine that the second fax machine is V.8 capable. In response to the AnsAm tone, the first fax machine generates a CM tone. The CM tone includes a set of all the fax modulations supported by the first fax machine. When the second fax machine receives the CM tone, it replies with a JM signal that indicates the particular modulation selected for that particular call, that is, the highest speed at which both machines can operate.

Fax machines connected over packet networks are generally connected using a protocol known as the T.38 protocol that includes a fax relay protocol. In May 2003, the T.38 fax relay protocol was extended to support the V.34 speed of 33,600 bps, that is the speed used by Super group 3 fax machines. However, many of the T.38 gateways that are presently deployed have not been upgraded to handle the V.34, 33,600 bps speed, in fax relay mode. Hereinafter the following terms will be used with the following meanings:

1) The T.38 protocol which has been enhanced to handle V.34, 33,600 bps speed, in fax relay mode will be referred to as the enhanced T.38 protocol.
2) The T.38 protocol which has not been enhanced to handle V.34 speed in fax relay mode will be called the un-enhanced T.38 protocol.
3) A Gateway operating according to the enhanced T.38 protocol will be referred to as a enhanced T.38 Gateway.
4) A Gateway operating according to the un-enhanced T.38 protocol will be referred to as an un-enhanced T.38 Gateway.

SUMMARY OF THE PRESENT INVENTION

The present invention provides a method and system for connecting V.34 enabled fax machines (that is fax machines capable of operating at 33,600 bps) over network gateways that use the un-enhanced T.38 protocol (that is, gateways that have not been upgraded to handle the V.34, 33,600 bps protocol in fax relay mode).

With the present invention, when a gateway detects a V.8 protocol signal, the signal is modified so that the fax machine fall back to a non V.34 protocol and operates at a slower speed which the un-enhanced T.38 gateways is capable of handling.

Two embodiments are described. In the first embodiment the AnsAm signal is modified by removing the 15 Hz envelope, thereby changing the signal to 2100 Hz tone without an envelope. Since the envelope has been removed, the machine receiving the AnsAm signal does not proceed with the V.8 negotiation and it does not generate a CM tome. The device which generated the AnsAm signal and which is waiting to receive a CM tone, times out and it falls back to Group 3 operation. The result is that the machines connect in Group 3 mode, notwithstanding the capability of operating in V.34 high speed mode.

In the second embodiment, the CM signal is modified. The modification involves changing a particular bit in the CM signal which indicates V.34 modulation capability (that is, this bit is disabled). Since the CM signal no longer indicates V.34 capability, the machine responding to the CM signal sends a JM signal that also does not have V.34 capability indicated. This causes both fax machines to fall back to Group 3 operation.

DESCRIPTION OF PREFERRED EMBODIMENTS

The V.34 standard for modems was first approved by the International Telecommunications Union's Telecom Standardization Section in September 1994. The V.34 standard for fax, was ratified in 1997. However, fax machines which implement the V.34 standard for fax did not appear in large number until about 2001.

Fax machines that implement the V.34 standard are often referred to as Super Group 3 fax machines. Fax machines using the V.34 fax standard (that is, Super Group 3 fax machines) transmit fax data more than twice as fast as machines which operate according to the prior V.17 (14.4 Kbps) protocol.

The overall time required to transmit a fax document can be divided into two parts. The first part of the process is a handshaking process during which the two fax machines coordinate how they will operate during the second part of the process. The second part of the process is the actual data transmission process. The V.34 fax standard, supports handshaking using what is known as the V.8 protocol.

Figure 1A:
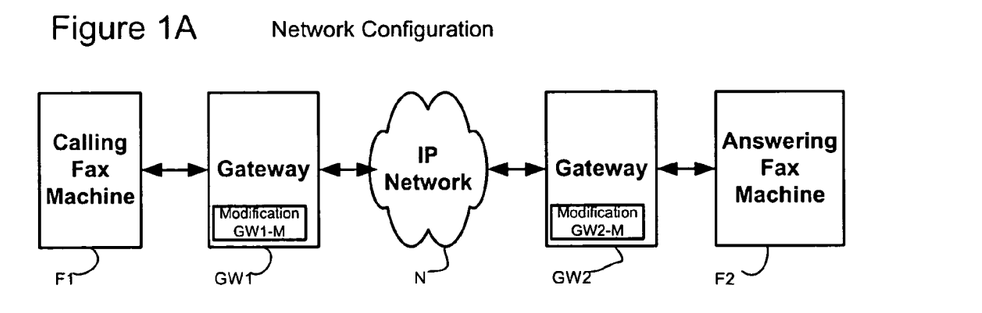
FIGS. 1A and 1B are overall system diagrams.

The present invention relates to the transmission of fax over an IP network such as that shown in FIG. 1A. When two fax machines are connected via an IP network, the first fax machine, designated F1 in FIG. 1, is connected to a gateway GW1 which in is turn connected to the IP network, designated N in FIG. 1. Likewise the second fax machine F2 is connected to a gateway GW2 which is connected to the IP network N.

The gateways used to connect fax machines generally operate according to the T.38 fax protocol. When two V.34 enabled fax machines connect using the T.38 fax protocol, the initial V.8 handshaking is typically done over a voice connection. Once the handshaking is complete and data transmission begins the system switches to T.38 fax relay mode.

The problem which the present invention addresses is the fact that many presently deployed gateways have not been upgraded to handle the V.34 fax protocol. That is many existing gateways operate in un-enhanced T.38 mode. Two V.34 enable fax machine which are connected via gateways and an IP network, could handshake over a voice connection and decide to operate at 33,600 bps according to the V.34 protocol. However, if the gateways to which they are connected have not been enhanced (that is if the gateways can not handle 33,600 bps in fax relay mode), the call will fail. Furthermore, since the handshaking operation (which took place over a voice connection) is already complete, the fax machines can not fall back to a lower speed.

The embodiments described below, allow two V.34 fax machines to communicate over a network even though one or both of the fax machines is connected to the network by an un-enhanced T.38 gateway.

In the first embodiment, the AnsAm signal generated by the answering fax machine is modified by removing the 15 Hz envelope, thereby changing the signal to 2100 Hz signal without an envelope. Since the envelope has been removed, the machine receiving the AnsAm signal does not proceed with the V.8 negotiation and it does not generate a CM tone. The fax machine waiting for the CM tone times out when it does not receive a CM tone and it falls back to Group 3 operation. The result is that the fax machines connect in Group 3 mode, notwithstanding the fact that both fax machines are capable of operating in V.34 high speed mode. It is noted that without the present invention, in the above described situation, a call would fail because the fax machines would initially connect in voice made using the V.8 protocol and they would begin operating in V.34 mode. However, since the gateways are un-enhanced, when the gateways switch to fax relay mode, the call would fail. As explained previously, un-enhanced T.38 gateways can not handle the V.34 speed in fax relay mode.

A system for implementing the first embodiment can have the configuration shown in FIG. 1 wherein the gateways GW1 and GW2 are conventional gateways that have been slightly modified by adding the additional programming designated GW1-M in and GW2-M shown in FIG. 1A. The additional programming GW1-M and GW2-M will be described below.

The gateways GW1 and GW2 may for example be the type of gateway marked by The Cisco Corporation under the family designation AS53xx, 26xx, or 37xx Alternatively, they could be various other commercially available un-enhanced T.38 gateways. In this first embodiment of the invention a small amount of code has been added to the gateways (designated GW1-M and GW2-M) such that when the gateways detect a signal that consists of 2100 Hz tone with a 15 Hz envelope, the 15 Hz envelope is stripped from the signal. Such software detectors and filters are conventional and within the state of the art. Thus, the specifics of the detector and filter are not further described herein.

Figure 2:
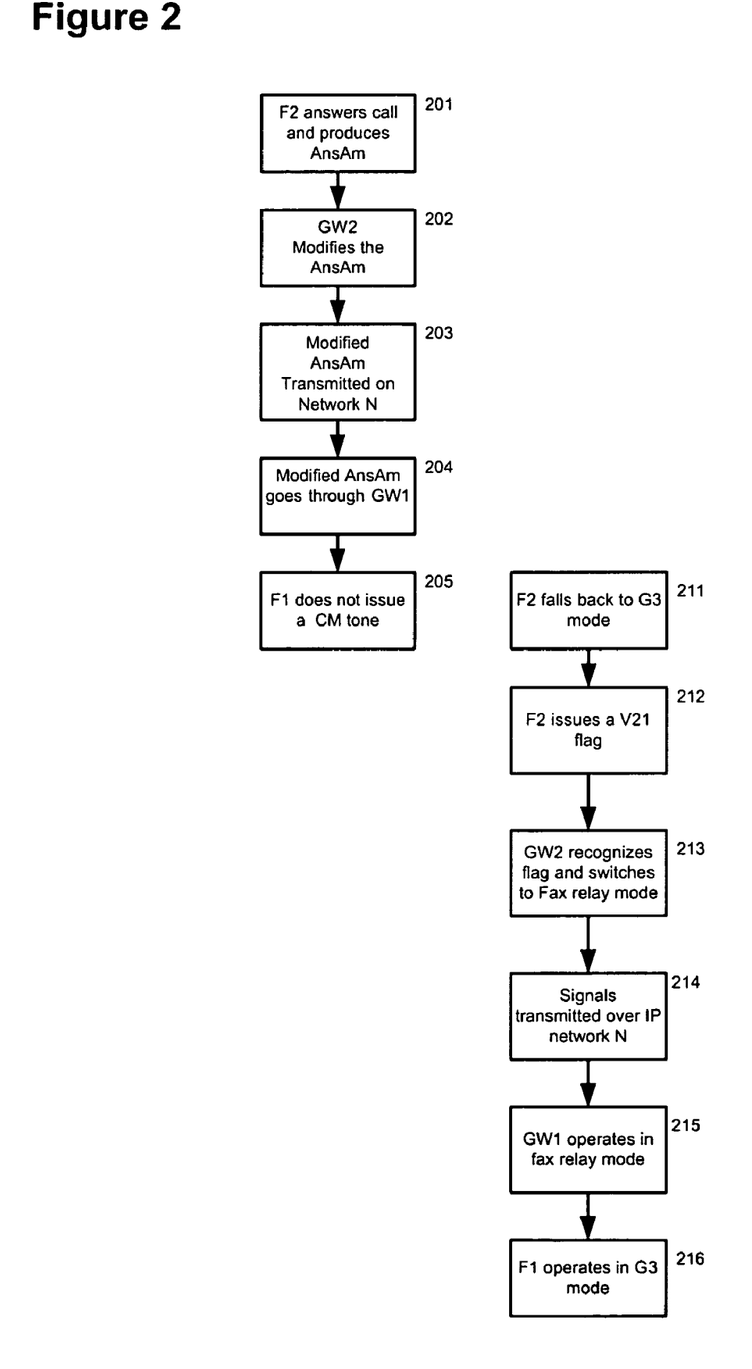
FIG. 2 is a flow diagram showing the operations of a first embodiment.

FIG. 2 is a block programming flow diagram illustrating the operation of the system. Using the process shown in FIG. 2, the two V.34 enabled fax machines F1 and F2 are connected via un-enhanced T.38 gateways G1 and G2. The fax machines F1 and F2 are both capable of operating at 33,600 bps. However, using the process illustrated in FIG. 2, they connect at a slower speed.

The process begins when F1 places a call to F2 over a voice line. F2 answers the call and produces an AnsAm signal as indicated by block 201. The AnsAM signal is a 2100 Hz tone with a 15 Hz envelope. The gateway GW2 modifies the AnsAm signal by removing the 15 Hz envelope.

As indicated by block 203, 204 and 205 the modified AnsAm signal is transmitted through gateway GW1 to fax machine F1. Since fax machine F1 does not receive an unmodified AnsAm signal it does not generate the CM tone that fax machine F2 is waiting to hear. Eventually, F2 times out from waiting for a CM tone and fax machine F2 falls back to Group 3 mode. When F2 falls back to Group 3 mode it issues a V.21 flag as indicated by block 211. The GW2 and GW1 gateways recognize this flag (as is conventional) and they switch to fax relay mode and pass the flag to fax machine F1. Fax machine F1 then proceeds to operate in Group 3 mode.

The result is that with the embodiment described above, two fax machines capable of operating in Super Group 3 mode (that is V.34 mode) when connected over an un-enhanced T.38 network can connect and then fall back and operate in Group 3 mode.

Figure 1B:
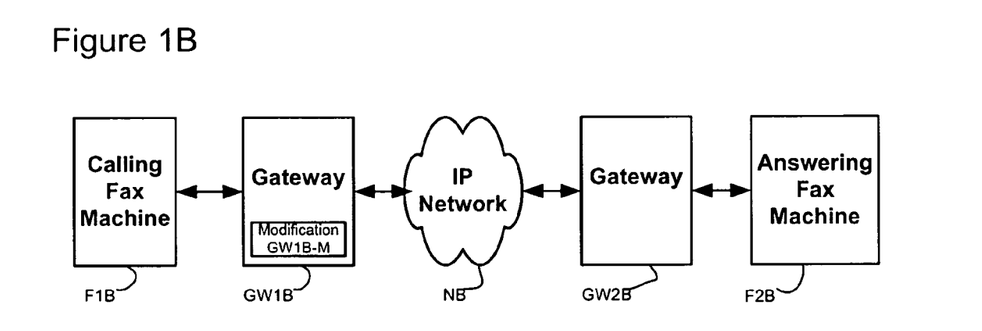

In the first embodiment of the invention, both the gateway to which the first fax machine is connected and the gateway to which the second fax machine is connected are capable of modifying the AnsAm signal. A second embodiment of the invention has a network where only one of the gateways is adapted to modify the AnsAm signal. Such a network is shown in FIG. 1B. The network shown in FIG. 1B is similar to the network shown in FIG. 1A except that only gateway GW1 has the code to modify the AnsAm signal.

Figure 3:
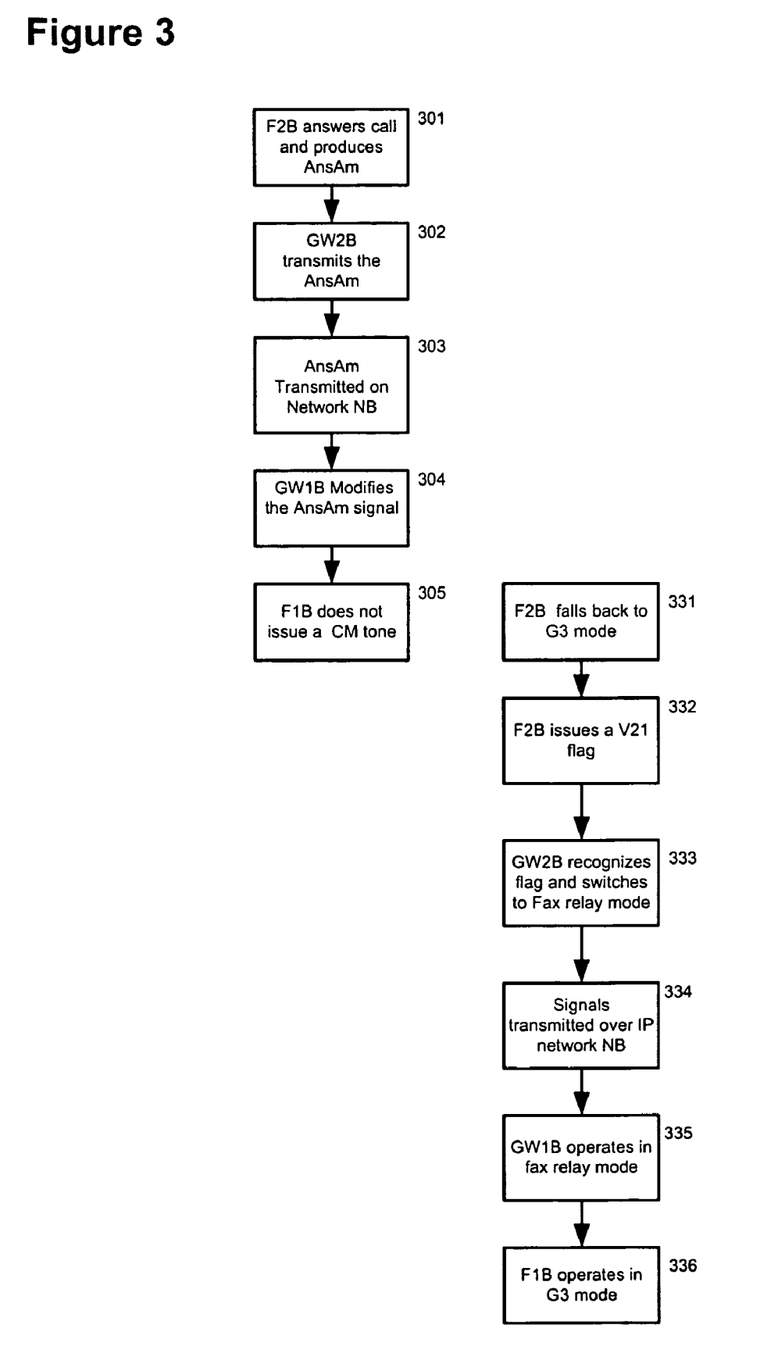
FIG. 3 is a flow diagram showing the operations of a second embodiment.

The operation of the second embodiment is shown in FIG. 3. The fax machine F1B calls the fax machine F2B and F2B answers and produces an AnsAm signal as indicated by block 301. Gateway GW2B (which does not have the modification code) transmits the AnsAm signal to the network which in turn send the signal to Gateway Gw1B as indicated by blocks 302 to 304. As indicated by block 305, the fax machine F1B which received the modified AnsAm signal does not generate a CM tone. Since Fax machine F2 does not receive a CM tone it falls back to G3 mode as indicated by block 331. The rest of the operations indicated by blocks 332 to 336 are similar to the oration of the first embodiment.

In summary with the second embodiment described above, two fax machines capable of operating in Super group 3 mode (that is V.34 mode) when connected over an un-enhanced T.38 network can connect and then fall back and operate in Group 3 mode. This occurs even though in this embodiment, only one of the gateways includes the signal modification code.

It is noted that as described above, only Gateway GW1B includes the code GW1M-M. In still another alternate embodiment (which is not illustrated in the diagrams) only the gateway connected to fax machine F2 includes the modification code. Such an embodiment operates similarly to the second embodiment described above.

The third embodiment of the invention utilizes a network configuration such as that shown in FIG. 1A. In this embodiment, the AnsAm signal is not modified. Instead the CM tone is modified. As defined by the V.8 protocol, a CM tone indicates all of the modulations supported by the fax machine which generates the tone. In this embodiment, the CM tone generated in response to an AnsAM signal is modified by disabling the bit which indicates that the machine generating the tone is capable of V.34 operation.

Figure 4:
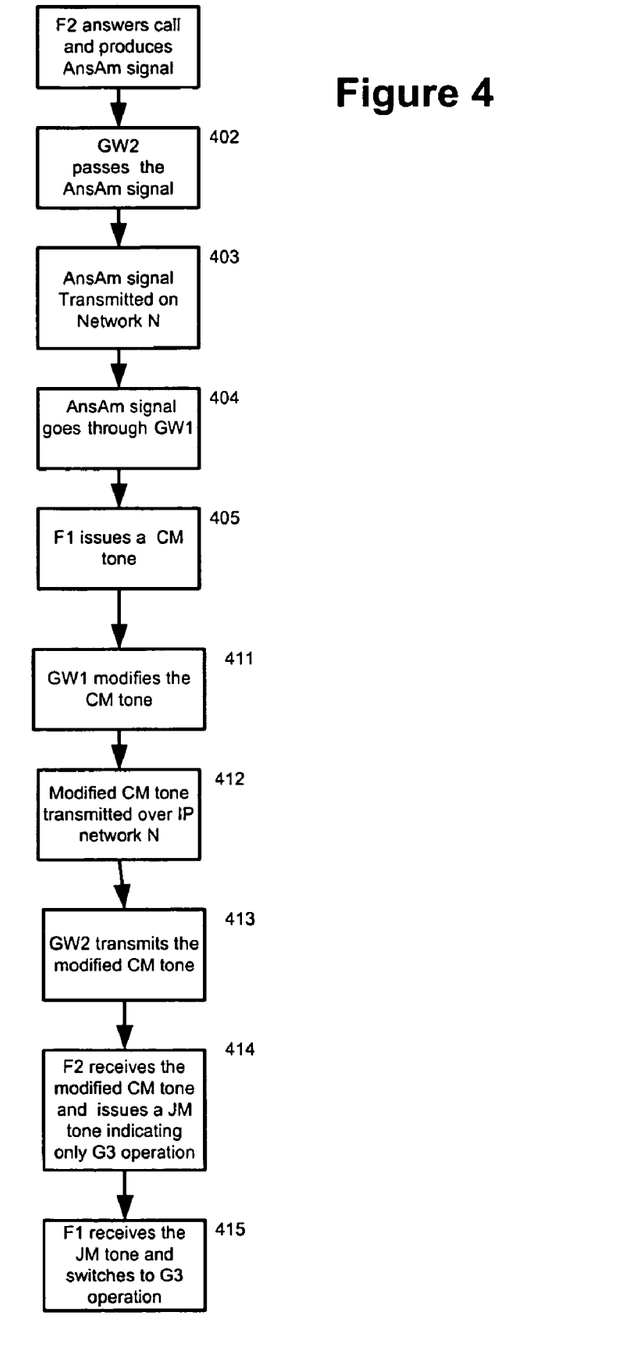
FIG. 4 is a flow diagram showing the operations of a third embodiment.

The operation of this third embodiment is shown in FIG. 4. Similar to the previous embodiments, the process begins when fax machine F1 places a call and fax machine F2 answers. F2 is a V.34 enabled fax machine, hence, it produces an AnsAm signal as indicated by block 401. In this embodiment, the AnsAm signal is passed through gateway GW2, the network N and gateway GW1 to fax machine F1 as indicated by blocks 402 to 404. When fax machine F1 received the AnsAm signal it produces a CM tone as indicated by block 405. Since fax machine F1 is a V.34 enabled fax machine, the CM tone has a bit which indicates that F1 is V.34 enabled. As indicated by block 411, with this embodiment, gateway GW1 modifies the CM tone by disabling the bit in the CM tone which indicates that fax F1 is V.34 enabled.

In this embodiment, the modification either code GW1-M or GW2-M in gateway GW1 and GW2, changes a bit in the CM signal rather than changing the AnsAm signal as in the first embodiment. Code for detecting the CM signal and changing a bit in this signal is within the skill of an network programmer and it is not described further herein.

As indicated by block 412 and 413, the modified CM tone is passed to the F2 fax machine. As indicated by block 414, when fax machine F2 receives the modified CM tone, it believes that fax machine F1 is not V.34 enabled, hence, it switches to Group 3 mode and issues a JM tone indicating only Group 3 operation. F1 received this JM tone and switches to Group 3 operation as indicated by block 415. Data transmission then proceeds using the Group 3 mode that the gateways are able to handle.

Thus with this third embodiment, two V.34 fax machines communicate over an un-enhanced T.38 gateways using the Group 3 mode. During the initial handshaking, the CM tone is modified by the gateway gateways so that the fax machine receiving the CM tone believes that the other fax machine is not V.34 enabled. Thus the fax machines switch to Group 3 mode.

The code to modify the CM signal can either be implemented in both gateway gateways as shown in FIG. 1A or this code can only be in one of the gateway gateways as shown in FIG. 1B. There are three possible configurations. (1) the modification code can be in both gateways, (2) the modification code can only be in gateway GW1, or (3) the modification code can only in gateway GW2.

It is noted that the embodiments described herein assume that the fax machines have properly and faithfully implemented the various applicable standards. If the fax machines have not properly implemented the standards, the embodiments may fail to operate properly. This is particularly the situation with respect to the embodiment which modifies the CM signal.

It is also noted that the terms "Super Group 3", "V.34", and "v-fast" refer to the same fax standard. All of these names are used in the technical literature to refer to the same fax standard. Likewise the terms "Group 3" and "G3" are used interchangeably to refer to the same fax standard. The terms "Group 3" and "G3" are used in the technical literature to refer to the same fax standard. The terms T.38, V.34, and V.8 are used herein in accordance with the well known meaning of these terms in the technical literature. The term IP is used herein to mean Internet protocol in accordance with the common meaning of this term in the technical literature.

It is further noted that while the embodiments shown herein are connected to the network by gateways, these gateways may be gateway routers, that is, the units which connect the fax machines to the network may be both gateways and routers. Furthermore, the network may include a large number of additional routers through which the packets must travel.

While several embodiments of the invention have been described, it will be understood by those skilled in the art that various other changes in form and detail can be made without departing from the spirit and scope of the invention. The invention is limited only by the appended claims.

We claim:

1. A method of connecting a first V.34 enabled fax machine to a second V.34 enabled fax machine over a network utilizing at least one gateway that operates in accordance with the T.38 un-enhanced protocol, said fax machines having an initial handshaking process during which an AnsAm signal consisting of a 2100 Hz tone with a 15 Hz envelope is generated, said method including:
   placing a call by said first fax machine to said second fax machine over a voice grade connection,
   generating an AnsAm signal by said second fax machine in response to said call,
   modifying the AnsAm signal generated during the initial handshaking by removing the 15 Hz envelope, whereby the first fax machine does not generate a CM tone, and said second fax machine falls back to G3 mode, and
   said first and second fax machine communicate using the G3 protocol.

2. The method recited in claim 1 wherein said network is an IP network.

3. The method recited in claim 1 wherein both of said fax machines are connected to said network by gateways that use the un-enhanced T.38 protocol.

4. The method recited in claim 1 wherein said first fax machine is connected to said network by a un-enhanced T.38 gateway and said second fax machine is connected to said network by an enhanced T.38 gateway.

5. The method recited in claim 1 wherein said second fax machine is connected to said network by a un-enhanced T.38 gateway and said first fax machine is connected to said network by an enhanced T.38 gateway.

6. The method recited in claim 1 wherein said initial handshaking is in accordance with the V.8 handshaking protocol.

7. A method of connecting a first V.34 enabled fax machine to a second V.34 enabled fax machine over a network that has one or more gateways that operate in accordance with the T.38 un-enhanced protocol, said fax machines having an initial handshaking process during which a CM signal is generated which includes a bit indicating that the calling fax machine is V.34 enabled, said method including:
   placing a call to said second fax machine by said first fax machine over a voice grade connection,
   generating an AnsAm signal by said second fax machine in response to said call,
   generating a CM signal by said first fax machine, said CM signal having a bit set to indicate that said first fax machine is V.34 enabled,
   modifying said CM signal in said gateway to disable said bit indicating that the calling fax machine is V.34 enabled,
   said second fax machine falls back to G3 mode, and said first and second fax machine communicate using the G3 protocol.

8. The method recited in claim 7 wherein said network is an IP network.

9. The method recited in claim 7 wherein both of said fax machines are connected to said network by gateways that use the un-enhanced T.38 protocol.

10. The method recited in claim 7 wherein said first fax machine is connected to said network by a un-enhanced T.38 gateway and said second fax machine is connected to said network by an enhanced T.38 gateway.

11. The method recited in claim 7 wherein said second fax machine is connected to said network by a un-enhanced T.38 gateway and said first fax machine is connected to said network by an enhanced T.38 gateway.

12. The method recited in claim 7 wherein said initial handshaking is in accordance with the V.8 handshaking protocol.

13. A method of connecting a first V.34 enabled fax machine to a second V.34 enabled fax machine over a network that includes a first gateway connecting said first fax machine to said network and a second gateway connecting said second fax machine to said network, said gateways operating in accordance with the T.38 un-enhanced protocol, said fax machines having an initial handshaking process during which an AnsAm signal consisting of a 2100 Hz tone with a 15 Hz envelope is generated, said method including:

placing a call to said second fax machine by said first fax machine over a voice grade connection, generating an AnsAm signal by said second fax machine in response to said call, modifying said AnsAm signal generated during the initial handshaking in one of said gateway gateways by removing the 15 Hz envelope, whereby the first fax machine does not generate a CM tone, said second fax machine falls back to G3 mode, and said first and second fax machine communicate using the G3 protocol.

14. In a system for connecting a calling Super Group 3 fax machine and a called Super Group 3 fax machine over an IP network that includes gateways that operate in accordance with the T.38 un-enhanced protocol, said fax machines initially connecting over a voice grade line using the V.8 protocol, whereby the called fax machine generates an AnsAm signal, a method including the steps of:

modifying said AnsAm signal whereby the called fax machine does not respond to the AnsAm signal with a CM tone, timing out by said called fax machine since it does not receive a CM signal, said called fax machine falling back to G3 mode as a result of said time out, and said calling and called fax machines proceeding to communicate in G3 mode.

15. A method of connecting a first V.34 enabled fax machine to a second V.34 enabled fax machine over a network by at least one gateway that operates in accordance with the T.38 un-enhanced protocol, said fax machines having an initial handshaking process during which an AnsAm signal consisting of a 2100 Hz tone with a 15 Hz envelope is generated, said method including:

placing a call by said first fax machine to said second fax machine over a voice grade connection, generating an AnsAm signal by said second fax machine in response to said call, modifying the AnsAm signal generated during the initial handshaking by removing the Hz envelope, whereby the first fax machine does not generate a CM tone, and said second fax machine falls back to G3 mode, and said first and second fax machine communicate using the G3 protocol.

\* \* \* \* \*

UNITED STATES PATENT AND TRADEMARK OFFICE
CERTIFICATE OF CORRECTION

PATENT NO.       : 7,623,273 B1
APPLICATION NO. : 10/743980
DATED            : November 24, 2009
INVENTOR(S)      : Garakani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1643 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,623,273 B1 | Page 1 of 1 |
| APPLICATION NO. | : 10/743980 | |
| DATED | : November 24, 2009 | |
| INVENTOR(S) | : Mehryar Khalili Garakani et al. | |

It is certified that error appears in the above-identified patent and that said Letters Patent is hereby corrected as shown below:

Figure 4, the first block in the diagram should be labeled -- 401 --;
Column 8, line 31, the word "Hz" should read -- 15 Hz --.

Signed and Sealed this
Twenty-first Day of August, 2012

David J. Kappos
*Director of the United States Patent and Trademark Office*